United States Patent
Masel et al.

(10) Patent No.: US 7,618,725 B2
(45) Date of Patent: Nov. 17, 2009

(54) LOW CONTAMINANT FORMIC ACID FUEL FOR DIRECT LIQUID FUEL CELL

(75) Inventors: Richard I. Masel, Champaign, IL (US); Yimin Zhu, Urbana, IL (US); Zakia Kahn, Palatine, IL (US); Malcolm Man, Vancouver (CA)

(73) Assignee: The Board of Trustees of the University of Illinois, Urbana, IL (US)

( * ) Notice: Subject to any disclaimer, the term of this patent is extended or adjusted under 35 U.S.C. 154(b) by 550 days.

(21) Appl. No.: 11/079,893

(22) Filed: Mar. 14, 2005

(65) Prior Publication Data

US 2006/0059769 A1    Mar. 23, 2006

Related U.S. Application Data

(60) Provisional application No. 60/611,906, filed on Sep. 21, 2004.

(51) Int. Cl.
*H01M 8/00* (2006.01)
*C06B 33/00* (2006.01)
*C10L 1/30* (2006.01)

(52) U.S. Cl. .............................. 429/12; 44/251; 44/358
(58) Field of Classification Search .................. 429/12; 44/251, 358
See application file for complete search history.

(56) References Cited

U.S. PATENT DOCUMENTS

| | | | |
|---|---|---|---|
| 2,407,157 A | 9/1946 | Hyde | |
| 3,983,010 A * | 9/1976 | Rauch et al. | 203/15 |
| 4,126,748 A | 11/1978 | Scholz | |
| 4,262,140 A | 4/1981 | Bott | |
| 5,294,740 A * | 3/1994 | Kiefer et al. | 562/609 |
| 5,393,922 A | 2/1995 | Sen | |
| 5,599,979 A | 2/1997 | Berg | |
| 5,633,402 A | 5/1997 | Berg | |
| 5,763,662 A | 6/1998 | Ikariya | |
| 5,869,739 A | 2/1999 | Ikariya | |
| 5,879,915 A | 3/1999 | Loubiere | |
| 5,904,740 A * | 5/1999 | Davis | 44/385 |
| 2003/0050506 A1 | 3/2003 | Auer et al. | |
| 2003/0198852 A1 | 10/2003 | Masel et al. | 429/30 |

OTHER PUBLICATIONS

Yimin et al., High power density direct formic acid fuel cells, Journal of Power Sources 130 (2004) 8-14.*

(Continued)

*Primary Examiner*—Patrick Ryan
*Assistant Examiner*—Thomas H. Parsons
(74) *Attorney, Agent, or Firm*—Greer, Burns & Crain, Ltd.

(57) ABSTRACT

A low contaminant formic acid fuel is especially suited toward use in a direct organic liquid fuel cell. A fuel of the invention provides high power output that is maintained for a substantial time and the fuel is substantially non-flammable. Specific contaminants and contaminant levels have been identified as being deleterious to the performance of a formic acid fuel in a fuel cell, and embodiments of the invention provide low contaminant fuels that have improved performance compared to known commercial bulk grade and commercial purified grade formic acid fuels. Preferred embodiment fuels (and fuel cells containing such fuels) including low levels of a combination of key contaminants, including acetic acid, methyl formate, and methanol.

8 Claims, 5 Drawing Sheets

OTHER PUBLICATIONS

Rice et al., Direct formic acid fuel cells, Journal of Power Sources 111 (2002) 83-89.*
GFS Double Distiller Formic Acid, Unknown.
Aldrich ACS Grade Formic Acid, Unknown.
BASF 90% Formic Acid, Unknown.
Orbiter WABE18-2 Formic Acid, Unknown.
Reidel Puriss Grade Formic Acid, Unknown.
BASF Corporation Formic Acid 88% Technical Data Sheet, Jan. 2006.

* cited by examiner

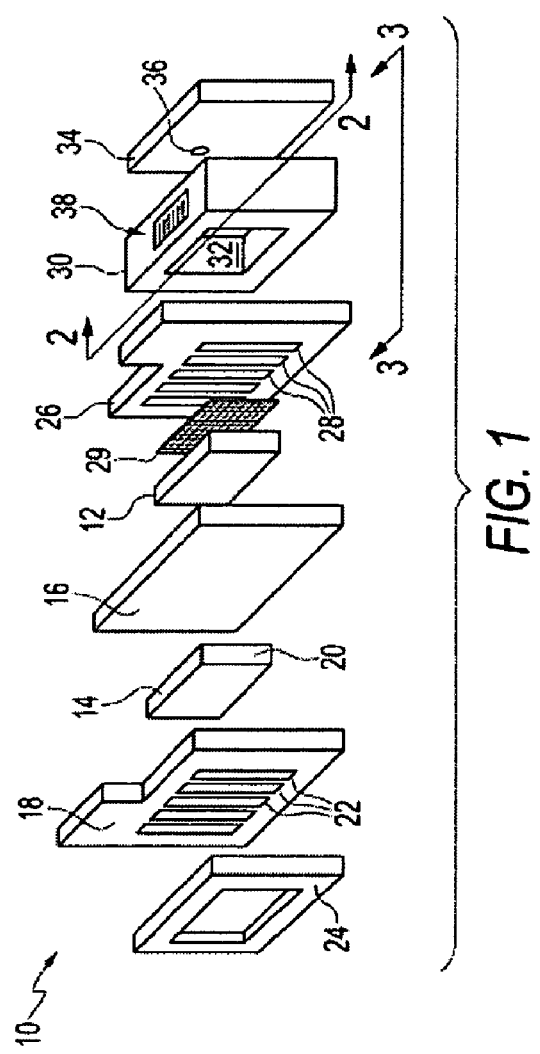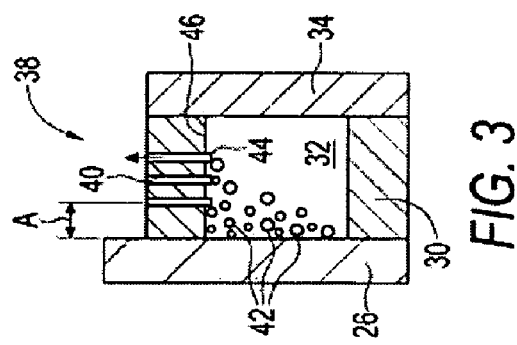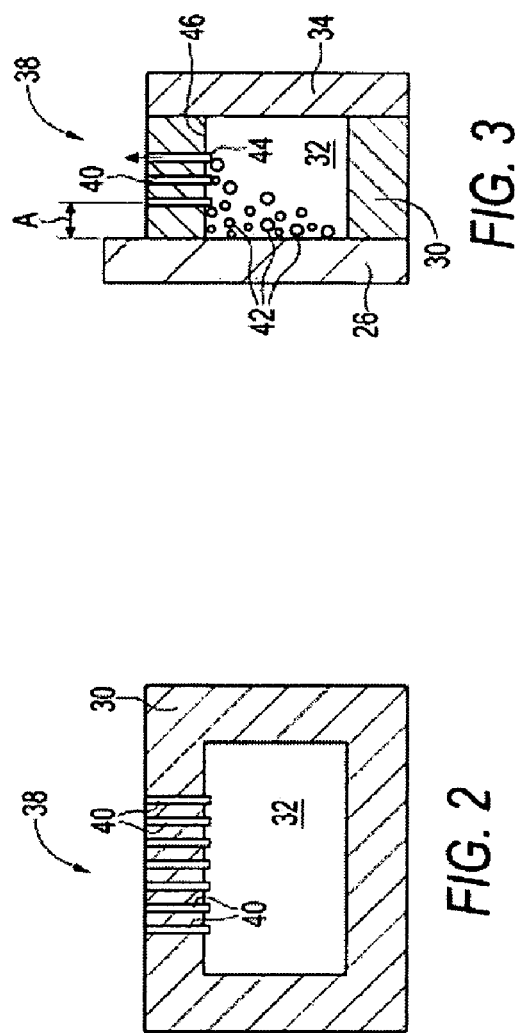

LOW CONTAMINANT FORMIC ACID FUEL FOR DIRECT LIQUID FUEL CELL

PRIORITY CLAIM

This application claims priority under 35 U.S.C. §119 of application Ser. No. 60/611,906 filed Sep. 21, 2004.

STATEMENT OF GOVERNMENT INTEREST

This invention was made with Government assistance under Department of Energy Grant No. DEGF-02-99ER14993. The Government has certain rights in the invention.

FIELD OF THE INVENTION

The field of the invention is liquid organic fuels. A fuel of the invention is applicable, for example, to direct liquid feed electrochemical fuel cells.

BACKGROUND

Fuel cells are electrochemical cells in which a free energy change resulting from a fuel oxidation reaction is converted into electrical energy. End uses for fuel cells include battery replacement, mini- and microelectronics, automotive engines and other transportation power generators, power plants, and many others. One advantage of fuel cells is that they are substantially pollution-free.

In hydrogen/oxygen fuel cells, hydrogen gas is oxidized to form water, with a useful electrical current produced as a byproduct of the oxidation reaction. A solid polymer membrane electrolyte layer can be employed to separate the hydrogen fuel from the oxygen. The anode and cathode are arranged on opposite faces of the membrane. Electron flow along the electrical connection between the anode and the cathode provides electrical power to load(s) interposed in circuit with the electrical connection between the anode and the cathode. Hydrogen fuel cells are impractical for many applications, however, because of difficulties related to storing and handling hydrogen gas.

Organic fuel cells may prove useful in many applications as an alternative to hydrogen fuel cells. In an organic fuel cell, an organic fuel such as methanol is oxidized to carbon dioxide at an anode, while air or oxygen is simultaneously reduced to water at a cathode. One advantage over hydrogen fuel cells is that organic/air fuel cells can be operated with a liquid organic fuel. This diminishes or eliminates problems associated with hydrogen gas handling and storage. Some organic fuel cells require initial conversion of the organic fuel to hydrogen gas by a reformer. These are referred to as indirect fuel cells.

The presence of a reformer increases cell size, cost, complexity and start up time. Other types of organic fuel cells, called direct fuel cells, avoid these disadvantages by directly oxidizing the organic fuel without conversion to hydrogen gas. Until recently, methanol and other alcohols were the fuel of choice in the development of direct fuel cells, and most research focused on the use of these fuels.

An advance in the art is presented in U.S. Patent Application Publication No. 2003/0198852 ("the '852 publication") and 2004/0115518 ("the '518 publication"). Embodiments described in these applications disclose formic acid fuel cells with high power densities and current output. Exemplary power densities of 15 mW/cm$^2$ and much higher were achieved at low operating temperatures. Additionally, embodiments described in those applications provided for compact fuel cells.

While fuel cells will have different configurations for different applications, the compact fuel cells will be suitable for replacement in small portable electronics, e.g., cellular handsets and personal digital assistants (PDAs). As an example, cellular handsets typically require a certain amount of power (usually 3 watts) which should fit within a cavity of approximately 10 cc to 30 cc. In order for a fuel cell technology to accomplish this, it must have the capability of operating at a high power density. Direct formic acid fuel cells in accordance with embodiments of the '852 publication and the '518 publication have been demonstrated as suitable to deliver such power in the small form factor suited to small portable electronics.

Commercial bulk grades of formic acid are made by a number of processes. Processes for making formic acid are disclosed in U.S. Pat. Nos. 5,879,915, 5,869,739, 5,763,662, 5,633,402, 5,599,979, 5,393,922, 4,262,140, 4,126,748 and 2,407,157. Commercial bulk grades of formic acid are used in a variety of industries and processes. It is used, for example in animal feed additives, to dye clothing, and in the manufacture of vinyl resin plastics. It is also used to manufacture aspartame. There are also commercial purified grades of formic acid. The commercial purified grades have a smaller market. The commercial purified grades are used, for example, as a solvent in high performance liquid chromatography (HPLC) and as solvents for other measurement techniques.

SUMMARY OF THE INVENTION

A low contaminant formic acid fuel is especially suited toward use in a direct organic liquid fuel cell. A fuel of the invention provides high power output that is maintained for a substantial time and the fuel is substantially non-flammable. Specific contaminants and contaminant levels have been identified as being deleterious to the performance of a formic acid fuel in a fuel cell, and embodiments of the invention provide low contaminant fuels that have improved performance compared to known commercial bulk grade and commercial purified grade formic acid fuels. Preferred embodiment fuels (and fuel cells containing such fuels) including low levels of a combination of key contaminants, including acetic acid and methyl formate.

BRIEF DESCRIPTION OF THE DRAWINGS

FIG. 1 is an exploded view of an exemplary embodiment fuel cell;

FIG. 2 is a view of a portion of the fuel cell of FIG. 1;

FIG. 3 is a view of a portion of the fuel cell of FIG. 1;

DETAILED DESCRIPTION OF THE PREFERRED EMBODIMENTS

Figure 4:
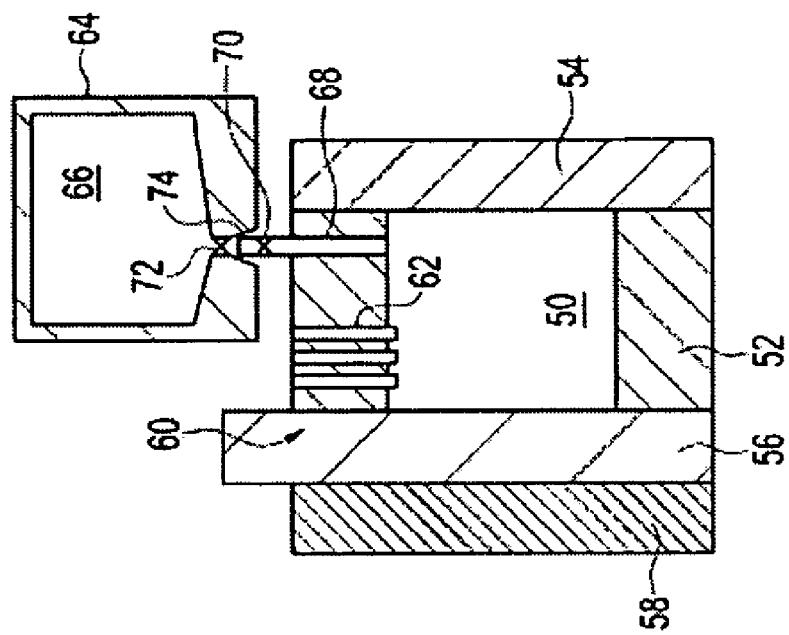
FIG. 4 is a partial view of another exemplary embodiment fuel cell.

The invention concerns a low contaminant formic acid fuel, and is especially suited toward use in a direct organic liquid fuel cell. A fuel of the invention provides high power output that is maintained for a substantial time and the fuel is substantially non-flammable. Specific contaminants and contaminant levels have been identified as being deleterious to the performance of a formic acid fuel in a fuel cell, and embodiments of the invention provide low contaminant fuels that have improved performance compared to known commercial bulk grade and commercial purified grade formic acid fuels.

It has been discovered that commercial bulk mixtures show significant batch-to-batch variations in performance. This is true of bulk commercial bulk grades that were tested, as well as commercial purified grades of formic acid that were tested. Particular contaminants are present in commercial bulk grade and commercial purified grade formic acids at levels that negatively impact the current density over time performance in a direct formic acid fuel cell. It has also been discovered that commercial bulk grades and certain commercial purified grades of formic acid are either flammable or have too low of a power density to be useful and are provided in a form that is inconvenient for use in a fuel cell.

Particular embodiments of the invention include formic acid fuels having low levels of acetic acid and methyl formate. Formic acid fuels in accordance with embodiments of the invention exhibit high power outputs, and provide less current degradation over time when used in a direct liquid fuel cell than commercial bulk grades and commercial purified grades of formic acid that were tested. Embodiments of the invention include formic acid and water mixtures having negligible amounts of key catalyst contaminants that we have identified.

The invention also includes methods for making formic acid fuels. An embodiment of the invention includes starting with a commercially available formic acid and water mixture, and then treating the mixture to eliminate key impurities. In an embodiment of the invention, key impurities are removed by freezing a formic acid and water mixture to separate impurities and collecting the purified formic acid from the separated impurities.

The invention also includes fuel cells with low impurity formic acid fuels, as well as cartridges with low impurity formic acid fuel for fuel cells. An exemplary fuel cell assembly 10 of the invention is shown in FIGS. 1-3. The fuel cell assembly includes an anode 12 and a cathode 14, with a solid polymer electrolyte 16 sandwiched therebetween. A preferred solid polymer electrolyte membrane 16 is a copolymer of tetrafluoroethylene and perfluorovinylether sulfonic acid, with an example being the membrane 16 available under the NAFION trade name from DuPont Chemical Co., Delaware. Other membrane materials can also be used, with examples including membranes of modified perfluorinated sulfonic acid polymer, polyhydrocarbon sulfonic acid, membranes containing other acidic ligands and composites of two or more kinds of proton exchange membranes.

The anode 12, cathode 14 and solid polymer electrolyte 16 can be formed as a unitary membrane electrode assembly (MEA). For example, an MEA can be formed when the anode 12 and cathode 14 are painted or otherwise deposited as a liquid ink or slurry form onto opposite surfaces of the membrane 16. Each of the anode 12 and the cathode 14 can include a catalyst layer with an example being finely comminuted platinum (Pt) and/or palladium (Pd) particles either supported or unsupported and directly applied to opposite sides of the NAFION membrane. In preferred embodiments, the catalyst is Pd. When the catalyst ink dries, solid catalyst particles adhere to the membrane 16 to form the anode 12 and the cathode 14.

A cathode current collector 18 covers a surface 20 of the cathode 14. A plurality of slots 22 through a portion of the cathode current collector 18 provides access to the cathode 20. An insulator 24 covers a portion of the cathode current collector 18. In the example, the cathode 14 of the exemplary cell remains open to the atmosphere, although other cell configurations are contemplated in which oxygen can be supplied through other means. An anode current collector 26 covers a surface of the anode 12. Like the cathode current collector 18, the anode current collector 26 has a plurality of slots 28 that provide access to the anode 12 and increase the operative surface area.

A conducting sheet 29 can be interposed or sandwiched between the current collector 26 and the anode 12 to facilitate distribution of charge. Although not illustrated, a conducting sheet 29 can also be provided between the cathode current collector 18 and the cathode 14. The conducting sheet 29 can be gold mesh, carbon cloth, or the like. The conducting sheet 29 can also provide some mass transfer functionality to facilitate transfer of fuel to the anode 12. For example, a carbon cloth that has been modified to change its surface interactions with water is believed to offer useful benefits and advantages for operation of some cells of the invention. The anode 12 and the anode current collector 26 are attached to an anode enclosure 30 that includes a cover plate 34 and defines a chamber 32. When the fuel cell 10 is assembled, the chamber 32 is operative to contain an organic fuel solution. A fill passage 36 allows for communicating fluids to and from the chamber 32. The fill passage 36 can be sealed to provide a self-contained fuel cell that can be useful, for instance, as a miniature power source for small or microelectronics devices.

The anode and cathode current collectors 26 and 18, can be formed, for example, of tantalum foils electrochemically coated with gold. The anode enclosure 30, formed for example of polytetrafluoroethylene (PTFE; commercially available under the trade name Teflon®), includes the chamber 32, and the cover plate 34, also for example of PTFE, closes the chamber so that it can contain a formic acid fuel solution. Passages 40 define a gas remover 38.

Gas bubbles 42 formed on the anode 12 will travel through the fuel solution held in the chamber 32 to the passages 40, through which they can then exit the chamber 32 in the direction of the arrow. As gas bubbles 42 are formed, the pressure in the chamber 32 increases and creates a pressure differential across the passages 40. The driving force of the pressure differential directs the gas bubbles 42 out of the chamber 32.

The passages 40 are configured to substantially prevent passage of the fuel solution while allowing gas to pass therethrough. It has been discovered that providing passages 40 in a generally tubular shape and with a length to diameter ratio of at least 0.5 is beneficial to prevent liquid flow, as is use of a hydrophobic surface on the interior surface of the passages 40. Preferably, the passages 40 have a diameter of no more than 0.031 inch (0.079 cm), and more preferably no more than 0.01 in. (0.0254 cm), and a length of at least 0.125 in. (0.3175 cm). At least about five passages 40 are preferably provided, and more preferably they are provided in a ratio of about twenty passages 40 of no more than 0.031 inch (0.079 cm) diameter per square centimeter of useful anode area. An exemplary hydrophobic construction material for the passages 40 includes the fluorocarbon-based polymer commercially available from 3M Corporation, Minneapolis Minn. under their registered trademark KEL-F. It is contemplated that the passages 40 can be provided in more than one wall of the anode enclosure 30.

To promote circulation of the fuel solution, the gas remover 38 is preferably configured to cause the gas bubbles 42 to travel some minimum distance through the chamber 32. For example, the passages 40 are preferably placed a distance A of at least 0.1 inches (0.254 centimeters) from the anode current collector 26. Also, it has been discovered that providing a passage entrance 44 that is separated by a distance from the wall 46 of the anode enclosure 30 is also useful to promote useful circulation of the fuel solution. A distance of at least 0.01 in. (0.0254 cm) is preferred.

FIG. 4 is generally consistent with portions of the fuel cell 10 shown in FIGS. 1-3. An anode chamber 50 is generally defined by an anode enclosure 52 and its cover plate 54. An anode current collector 56 and a solid polymer electrolyte membrane 58 communicate with the chamber 50. Although not illustrated, a cathode, a cathode current collector, and other elements can be present on the opposite side of the membrane 58 from the anode current collector 56. A gas remover shown generally at 60 includes a plurality of passages 62 for removing gas from the chamber 50.

The exemplary fuel cell embodiment of FIG. 4 includes a replaceable fuel cartridge 64. The replaceable cartridge 64 includes a fuel reservoir 66 for holding a supply of a low contaminant formic acid fuel solution. The replaceable cartridge 64 can be constructed of any suitable material, with an example being a PTFE such as TEFLON. The anode enclosure 52 is provided with a loading passage communicating with the chamber 50, with the loading tube 68 of FIG. 4 being an exemplary loading passage. The loading tube 68 is configured to mate with the replaceable cartridge 64. Preferably, the loading tube 68 includes a sealing mechanism such as a check valve 70. The check valve 70 is configured to provide one-way flow whereby flow is allowed into the chamber 50 from the cartridge reservoir 66 but reverse flow out of the chamber 50 is prevented. Other sealing mechanisms and configurations are also contemplated.

The replaceable cartridge 64 includes a recessed valve 72 that is located at the terminal end of a loading port 74. An exemplary loading port 74 comprises a generally tapered cavity configured to receive the loading tube 68 and guide it into engagement with the recessed valve 72. The valve 72 can comprise a spring-loaded or like configured valve that opens when the loading tube 68 engages it. Configurations like the exemplary recessed valve 72 and loading port 74 can be desirable to reduce the chances of exposure of a fuel solution to user contact during loading.

The replaceable cartridge 64 is useful to load fuel solution into the chamber 50 after depletion of existing fuel. It will be appreciated that the loading tube 68 can extend for any practical distance, so that a fuel cell of the invention can be within the body of an electronic device and yet remain accessible for re-fueling.

The fuel cells and cartridge in FIGS. 1-4 include a low contaminant formic acid fuel that provides a sustained current performance. The low contaminant fuel is preferably substantially free from acetic acid and methyl formate. Exemplary embodiment fuels have been prepared and tested. Experiments and results will now be discussed. Various additional features of the invention and preferred embodiments of the invention will be illustrated by the following data, while artisans will appreciate that the invention is not limited to the particular example fuels and exemplary methods of making that are described with respect to the experiments.

A preferred fuel composition was made by starting with 99% Reidel Puriss formic acid purchased from Sigma Aldrich (St Louis, Mo.) stock #33015. About 122 cc of the fuel was placed in a 1 liter plastic bottle, 10 ml of deionized water was added, then the bottle was placed in a −20° C. freezer for 5 hours. Formic acid crystals formed along the walls of the bottle, while liquid remained in the center. The liquid was poured out of the bottle. The crystals were then rinsed in deionized water and then the crystals were allowed to melt. 38 milliliters of the melted crystals was placed in a 50 ml graduated cylinder, 12 milliliters of deionized water was added, producing the "preferred formic acid composition 1" listed in Table 1.

This method used to produce the "preferred formic acid composition 1" works well with the purified commercial grades as a starting point. When commercial bulk grades are used as a starting point, the steps may need to be repeated to reduce methyl formate and acetic acid levels. Alternately, a preliminary distillation step can be conducted with a commercial bulk grade formic acid prior to freezing.

Tests on the "preferred formic acid composition 1" were conducted commercial fuel cell test hardware from Fuel Cell Technologies. The MEA for these experiments was prepared as follows. Anode and cathode catalyst inks were prepared by mixing appropriate amounts of catalyst powders with 5% recast NAFION solution (1100 EW, Solution Technology, Inc., USA). Englehardt #s020284 palladium black or Sigma Aldrich (St. Louis, Mo.) #20,582-4 were used as anode catalysts while Johnson Mathey highspec 6000 platinum black was used as a cathode catalyst. Both the anode and cathode inks were applied onto either side of a NAFION 117 membrane (Dupont), which was fixed on a vacuum table. Ink application was typically performed at 60° C., after which the membrane was thermally cured at 80° C. for 15 minutes. The anode catalysts employed had a loading of about 10 mg/cm$^2$. The geometric surface area of the MEAs employed in this work was 5 cm$^2$. The cathode ink formulation was approximately 90% by weight Pt black and 10% by weight NAFION. The cathode catalyst employed had a standard loading of 8 mg/cm$^2$. The experiments were conducted by feeding 1 cc/min of 10 M formic acid to the anode, and 100 sccm (standard cubic centimeters) of dry air to the cathode. We ran the membrane for 1 hour at 0.53 volts and recorded the current as a function of time. Table 1 summarizes the results. Notice that the preferred fuel exhibits an energy density above 800 w-hr/liter, shows less than 22% loss of current in 1 hour, and is not flammable. Table 1 summarizes the measured contaminants. The results for the preferred fuel composition are the worst measured result. In many cases the impurity concentrations (of methyl formate and acetic acid) were below our measurement limit (about 1 part per million (ppm)). By contrast, for each of the commercial grades, the best case test result is presented. While it is noted that there were batch to batch variations in the levels of contaminants noticed during testing, in each test case the impurity levels were no lower that shown. Further, higher levels of acetic acid and methyl formate produced worse results.

TABLE 1

Results of experiments where various samples of formic acid were evaluated in commercial fuel cell test fixtures and by gas chromatography

| Sample | % formic acid | Molarity | Theoretical energy density at 0.7 V, w-hr/lit | % current loss in 1 hr | % acetic acid, GC analysis | % Acetic Acid per spec | % methyl formate, GC analysis | Flammable? (Flash point below 61 C.) |
|---|---|---|---|---|---|---|---|---|
| Preferred formic acid composition[1] | 84 | 22 | 810 | 21% | <1 ppm | N.A. | 10 ppm | No |
| GFS - double distilled lot T1[2] | 89-91 | 23 | 880 | 48% | 1000 ppm | <0.4% | 20 ppm | Yes |
| GFS - double distilled lot P457100[1] | 89-91 | 23 | 880 | 27% | 3100 ppm | <0.4% | 10 ppm | Yes |
| Aldrich ACS grade[1] | 89-91 | 23 | 880 | 50% | 3200 ppm | <0.4% | 10 ppm | Yes |
| Fluka HPLC grade[1] | 50 | 13 | 450 | 24% | <1 ppm | <10 ppm | 30 ppm | No |
| BASF 90% D13456[1] | 89-91 | 23 | 880 | 62% | 4700 ppm | N.A. | <10 ppm | Yes |
| Orbiter WABE18-2[1] | 99.9 | 26 | 990 | 43% | 3600 ppm | <0.4% | 10 ppm | Yes |
| Reidel Puriss grade | 99 | 26 | 980 | 28% | 50 ppm | <0.005% | 30 ppm | Yes |

N.A. = Not Applicable,
[1]Englehardt #s020284 anode catalyst
[2]Aldrich #20,582-4 anode catalyst Only the preferred fuel and the Fluka fuel were non-flammable. Despite the more concentrated mixture of the preferred fuel (84% compared to 50% for the Fluka), the maximum measured methyl formate for the preferred fuel was 10 ppm, while the Fluka level best case was 30 ppm. Other fuels tested here, excepting the Fluka fuel, also have much higher levels of acetic acid. The preferred fuel has much lower level of acetic acid, and in some cases no measurable quantity was detected. The preferred fuel worst case scenario of current loss over an hour was 21%, the lowest level of the fuels tested.

Table 2 shows the energy density of the fuel mixtures as a function of the fuel composition. Fuel concentration in the fuel reservoir must be at least 61% for the theoretical energy density to be at least 2× the 275 w-hr/lit reported for lithium batteries. This provides a practical fuel reservoir for commercial purposes. Mixtures with 88% or more formic acid have a flash point below 60 C. In preferred embodiments, the fuel reservoir constitutes a fuel cartridge, such as the cartridge 350 with at least about 61% and no more than about 88% formic acid. Fuel cells of the invention may, at times, operate with lower fuel concentrations contacting the anode. Adequate current, for example to charge a battery from a fuel cell can be provided when the formic acid concentration drops to as low as about 10%. Having low concentrations of key contaminants at levels where the energy density is low, such as at 10%, is important to maintain current density. Items with flash points below 60° C. require special packaging during transport.

TABLE 2

The energy density of various formic acid/water mixtures as a function of the formic acid concentration

| Formic acid Concentration | Theoretical energy density at 0.7 V, w-hr/lit |
|---|---|
| 50% | 500 |
| 56% | 550 |
| 60% | 590 |
| 70% | 690 |
| 80% | 790 |
| 88% | 870 |
| 90% | 890 |
| 99% | 980 |
| 99.90% | 990 |

Figure 5:
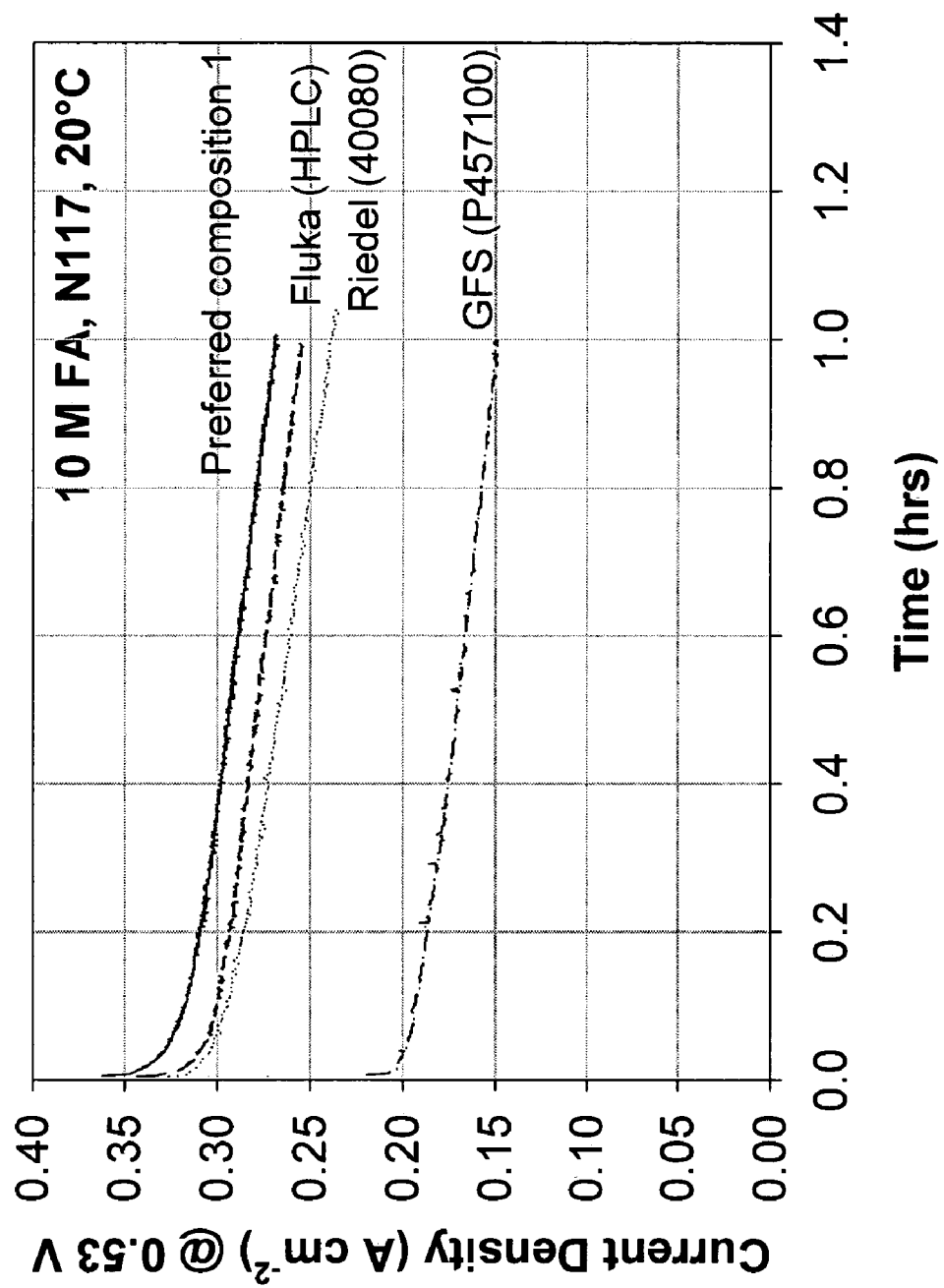
FIG. 5 plots the current density over time for an exemplary embodiment fuel and various commercial purified grade samples.

FIG. 5 compares the performance of the preferred composition to several of the best commercial grade formic acid samples. An additional sample, referred to as "GFS formic acid" with 1000 ppm of acetic acid is also included. Notice the preferred composition gives the best performance when diluted to 10 M. The results of FIG. 5 were obtained when each of the samples was diluted with Millipore deionized water to produce a 10 M solution. 1 cc/min of the 10 M formic acid solution was fed to the anode, and 100 sccm of dry air was fed to the cathode.

Figure 6:
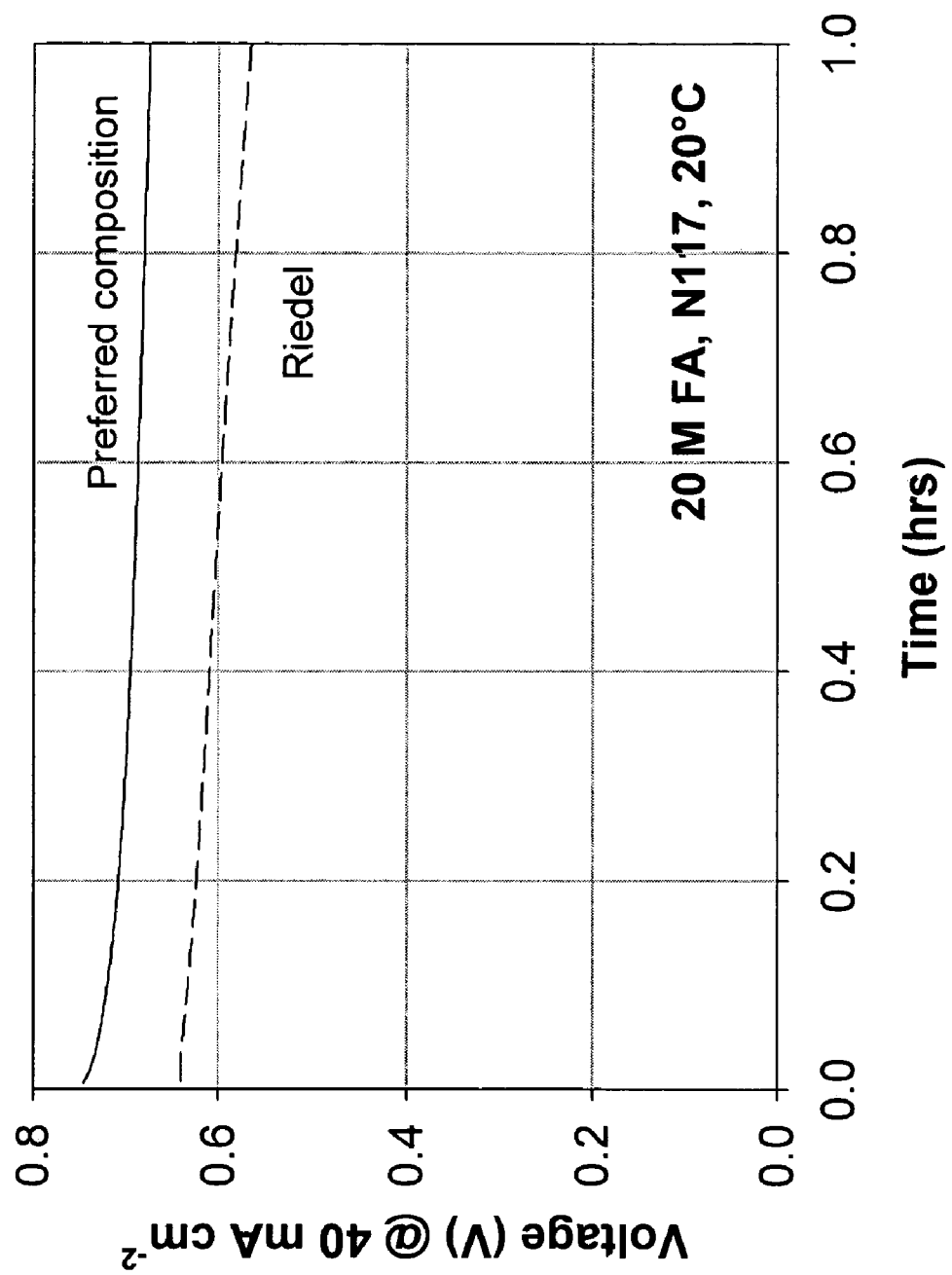
FIG. 6 plots the voltage over time for an exemplary embodiment fuel and a commercial purified grade sample.

FIG. 6 compares performance of the best of the formic acid samples at 20 M. In these experiments, each of the samples was diluted with Millipore deionized water to produce a 20 M solution. 0.5 cc/min of the 20 M formic acid solution was fed to the anode, and 100 sccm of dry air was fed to the cathode. The HPLC formic acid was not included in this comparison since it is sold as a 13 M solutions and one cannot dilute a 13 M solution to produce 20 M formic acid. The preferred composition produces a higher voltage that declines less drastically over time than the Reidel commercial grade formic acid fuel.

The various commercial formic acid samples were also analyzed by gas chromatography (GC) and the results are shown in Table 3. With the exception of Fluka HPLC grade formic acid, the remaining commercial samples tested here contain significant amounts of methyl formate and or acetic acid while the preferred composition is substantially free of methyl formate and acetic acid and the Fluka HPLC grade, while substantially free of acetic acid, includes an appreciable amount of methyl formate that is ten times that of the preferred fuel even though the Fluka has only 50% formic acid while the preferred fuel was measured at 84% formic acid.

In addition, the preferred composition and the Fluka Formic acid were analyzed by Ion coupled plasma mass spectroscometry (ICP_MS). Table 3 compares the results, and shows that the preferred composition has less iron and silicon than the Fluka on a water free basis.

TABLE 3

ICPMS analysis of the HPLC and preferred formic acid composition

| Element | Preferred Composition (water free basis) | Fluka HPLC grade (50% Formic Acid) | Fluka HPLC grade - water free basis |
|---|---|---|---|
| Lithium | <1 ppm | <1 ppm | <1 ppm |
| Beryllium | <1 ppm | <1 ppm | <1 ppm |
| Boron | <1 ppm | <1 ppm | <1 ppm |
| Magnesium | <2 ppm | <2 ppm | <2 ppm |
| Aluminum | 3 ppm | 4 ppm | 8 ppm |
| Calcium | <34 ppm | <34 ppm | <34 ppm |
| Scandium | <1 ppm | <1 ppm | <1 ppm |
| Titanium | <1 ppm | <1 ppm | <1 ppm |
| Vanadium | <12 ppm | <12 ppm | <12 ppm |
| Chromium | 1 ppm | <1 ppm | <1 ppm |
| Manganese | <1 ppm | <1 ppm | <1 ppm |
| Iron | 12 ppm | 18 ppm | 36 ppm |
| Cobalt | <1 ppm | <1 ppm | <1 ppm |
| Nickel | <1 ppm | <1 ppm | <1 ppm |
| Copper | <1 ppm | <1 ppm | <1 ppm |
| Zinc | <18 ppm | <18 ppm | <18 ppm |
| Gallium | <1 ppm | <1 ppm | <1 ppm |
| Germanium | <1 ppm | <1 ppm | <1 ppm |
| Arsenic | <6 ppm | <6 ppm | <6 ppm |
| Selenium | <1 ppm | <1 ppm | <1 ppm |
| Rubidium | <1 ppm | <1 ppm | <1 ppm |
| Strontium | <1 ppm | <1 ppm | <1 ppm |
| Yttrium | <1 ppm | <1 ppm | <1 ppm |
| Zirconium | <1 ppm | <1 ppm | <1 ppm |
| Niobium | <1 ppm | <1 ppm | <1 ppm |
| Molybdenum | <1 ppm | <1 ppm | <1 ppm |
| Ruthenium | <1 ppm | <1 ppm | <1 ppm |
| Rhodium | <1 ppm | <1 ppm | <1 ppm |
| Palladium | 2 ppm | <1 ppm | <1 ppm |
| Silver | <1 ppm | <1 ppm | <1 ppm |
| Cadmium | <1 ppm | <1 ppm | <1 ppm |
| Indium | <1 ppm | <1 ppm | <1 ppm |
| Tin | <1 ppm | <1 ppm | <1 ppm |
| Antimony | <1 ppm | <1 ppm | <1 ppm |
| Tellurium | <1 ppm | <1 ppm | <1 ppm |
| Cesium | <1 ppm | <1 ppm | <1 ppm |
| Barium | <1 ppm | <1 ppm | <1 ppm |
| Lanthanum | <1 ppm | <1 ppm | <1 ppm |
| Cerium | <1 ppm | <1 ppm | <1 ppm |
| Praseodymium | <1 ppm | <1 ppm | <1 ppm |
| Neodymium | <1 ppm | <1 ppm | <1 ppm |
| Samarium | <1 ppm | <1 ppm | <1 ppm |
| Europium | <1 ppm | <1 ppm | <1 ppm |
| Gadolinium | <1 ppm | <1 ppm | <1 ppm |
| Terbium | <1 ppm | <1 ppm | <1 ppm |
| Dysprosium | <1 ppm | <1 ppm | <1 ppm |
| Holmium | <1 ppm | <1 ppm | <1 ppm |
| Erbium | <1 ppm | <1 ppm | <1 ppm |
| Thulium | <1 ppm | <1 ppm | <1 ppm |
| Ytterbium | <1 ppm | <1 ppm | <1 ppm |
| Lutetium | <1 ppm | <1 ppm | <1 ppm |
| Hafnium | <1 ppm | <1 ppm | <1 ppm |
| Tantalum | <1 ppm | <1 ppm | <1 ppm |
| Tungsten | <1 ppm | <1 ppm | <1 ppm |
| Rhenium | <1 ppm | <1 ppm | <1 ppm |
| Iridium | <1 ppm | <1 ppm | <1 ppm |
| Platinum | <1 ppm | 6 ppm | 12 ppm |
| Gold | 2 ppm | <1 ppm | <1 ppm |
| Thallium | <1 ppm | <1 ppm | <1 ppm |
| Lead | <1 ppm | <1 ppm | <1 ppm |
| Bismuth | <1 ppm | <1 ppm | <1 ppm |
| Thorium | <1 ppm | <1 ppm | <1 ppm |
| Uranium | <1 ppm | <1 ppm | <1 ppm |
| Sodium | <24 ppm | <24 ppm | <48 ppm |
| Potassium | <26 ppm | <26 ppm | <52 ppm |
| Silicon | 44 | 29 ppm | 59 ppm |

Experiments were also conducted to evaluate the effects of methanol (which converts to methyl formate in a formic acid solution), methyl formate and acetic acid. These constituents have been identified as key contaminants to a formic acid fuel, and the preferred fuels are substantially free or have very low levels of these contaminants. In one test, with Fluka HPLC grade formic acid as the starting material, various amounts of methanol, methyl formate and acetic acid were added. Table 4 summarizes the results. Measurable performance degradation was observed when as little as 100 ppm of methanol, methyl formate or acetic acid were added to the HPLC grade formic acid. Particularly, the current loss over time increased significantly.

TABLE 4

Results of experiments where various impurities were added to various commercial formic acid solutions and then evaluated as in Table 1. All anodes used Englehardt # s020284 catalyst

| Sample | Ppm acetic acid | ppm methyl formate | % methanol | Initial Current at 0.53 V, ma/cm$^2$ | % current loss in 1 hr |
|---|---|---|---|---|---|
| Fluka HPLC grade | <1 ppm | 110 ppm | <1 ppm | 327 | 24 |
| Fluka HPLC grade + 0.4% acetic acid | 4000 ppm | 110 ppm | <1 ppm | 178 | 40 |
| Fluka HPLC grade + 0.04% acetic acid | 400 ppm | 110 ppm | <1 ppm | 245 | 38 |
| Fluka HPLC grade + 0.01% acetic acid | 100 ppm | 110 ppm | <1 ppm | 320 | 36 |
| Fluka HPLC grade + 0.4% methyl formate | <1 ppm | 4000 ppm | <1 ppm | 230 | 98 |

TABLE 4-continued

Results of experiments where various impurities were added to various commercial formic acid solutions and then evaluated as in Table 1. All anodes used Englehardt # s020284 catalyst

| Sample | Ppm acetic acid | ppm methyl formate | % methanol | Initial Current at 0.53 V, ma/cm$^2$ | % current loss in 1 hr |
|---|---|---|---|---|---|
| Fluka HPLC grade + 0.04% methyl formate | <1 ppm | 500 ppm | <1 ppm | 286 | 73 |
| Fluka HPLC grade + 0.01% methyl formate | <1 ppm | 200 ppm | <1 ppm | 328 | 29 |
| Fluka HPLC grade + 0.4% methanol | <1 ppm | 110 ppm | 4000 ppm[1] | 228 | 99 |
| Fluka HPLC grade + 0.04% methanol | <1 ppm | 110 ppm | 400 ppm[1] | 327 | 88 |
| Fluka HPLC grade + 0.005% methanol | <1 ppm | 110 ppm | 50 ppm[1] | 327 | 33 |

[1]Initial methanol composition. Methanol reacts with formic acid to form methyl formate in solution. The methanol is almost completely converted to methylformate after about 1 hr.

Figure 7:
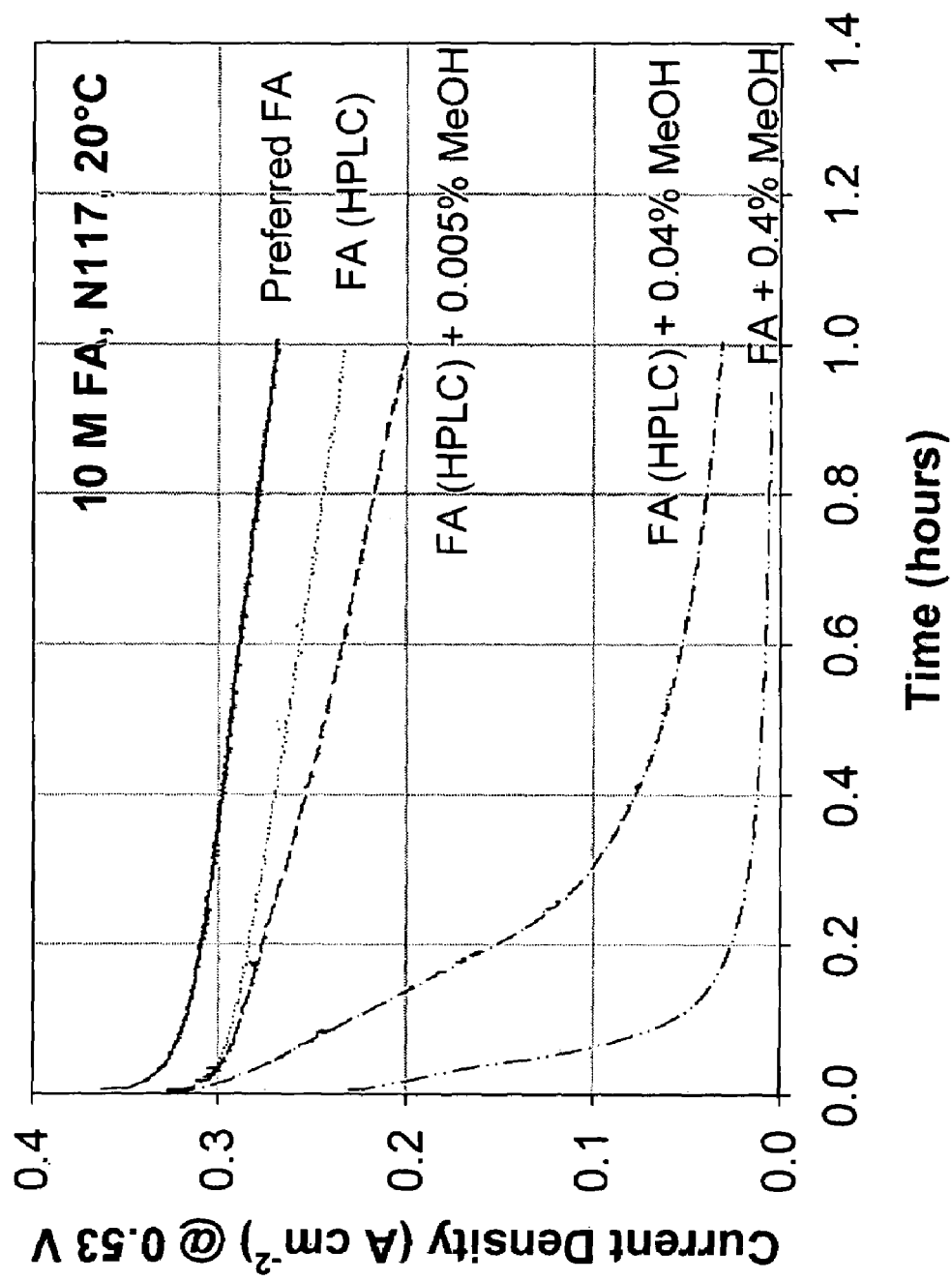
FIG. 7 plots the current density over time for an exemplary embodiment fuel and a commercial purified grade sample with varying levels of methanol added.

The effect of methanol has also been explored. Because methanol itself is a fuel in certain direct fuel cells, methanol has sometimes been considered in the art to be a beneficial in a formic acid fuel cell. However, methanol has actually been shown to be deleterious to fuel cell performance. Methanol reacts with formic acid to form methyl formate in solution. The methanol is almost completely converted to methyl formate after about 1 hr. Methanol may therefore generally be considered to create methyl formate contamination in a formic acid fuel solution. FIG. 7 shows the effect of methanol. Increasing quantities of methanol were added to the Fluka HPLC grade formic acid fuel. FIG. 7 shows traces, from top to bottom of a preferred low contaminant fuel of the invention, the Fluka HPLC fuel, and ten the Fluka fuel with addition of increasing levels of methanol: 0.005%, 0.04%, and 0.4%.

In FIG. 7, it is seen that 50 ppm (0.05%) of produces a noticeable degradation on performance, while a substantial degradation is produced at 400 ppm (0.04%). To obtain the results in FIG. 7, each of the samples was diluted with Millipore deionized water to produce a 10 M solution. 0.5 cc/min of the 10 M formic acid solution was fed to the anode, and 100 sccm of dry air was fed to the cathode of the MEA.

TABLE 5

Results of experiments where various impurities were added to commercial formic acid solutions containing 1000 ppm of acetic acid and no measurable methyl formate and then evaluated as in Table 1. All anodes used Aldrich #20,582-4 catalyst

| Sample | boric acid concentration | HBF$_4$ molarity | % current loss in 1 hr |
|---|---|---|---|
| GFS - double distilled lot T1 | <10 ppm | 0 | 48 |
| GFS - double distilled lot T1 + 0.01 M boric acid | 620 ppm | 0 | 19 |
| GFS - double distilled lot T1 + 0.02 M boric acid | 1230 ppm | 0 | 29 |
| GFS - double distilled lot T1 + 0.02 M HBF$_4$ | <10 ppm | 1760 | 30 |

TABLE 6

Results of experiments where HBF$_4$ was added to commercial 3 M formic acid solutions containing 100 ppm of acetic acid and no measurable methyl formate and then evaluated in an electrochemical half cell. All anodes used Aldrich #20,582-4 catalyst

| Sample | boric acid concentration | HBF$_4$ concentration | % current loss in 2 hr |
|---|---|---|---|
| GFS - double distilled lot T1 + 0.01 M HBF$_4$ | <10 ppm | 880 ppm | 7.3% |
| GFS - double distilled lot T1 + 0.02 M HBF$_4$ | <10 ppm | 1760 ppm | 35.7% |
| GFS - double distilled lot T1 + 0.03 M HBF$_4$ | <10 ppm | 2440 ppm | 52.4% |

Other components that affect fuel cell performance have also been explored. Small quantities of boric acid and HBF$_4$ reverse current loss. Tables 5 and 6 shows those results. The addition of 620 ppm of boric acid substantially improves the fuel cell performance but 1230 ppm is ineffective. A preferred embodiment fuel comprises at least about 620 ppm and less than 1230 ppm boric acid. Similarly 880 ppm of HBF$_4$ substantially improves the fuel cell performance, but poorer performance is seen with 1760 ppm. 2440 ppm produces unacceptable performance. A preferred embodiment fuel comprises at least about 880 ppm HBF$_4$ and less than 1760 ppm HBF$_4$.

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A fuel for a liquid feed fuel cell, the fuel comprising:
at least about 61% by weight formic acid;
a remaining weight substantially consisting of water;
less than about 25 ppm by weight methyl formate;
less than about 50 ppm by weight acetic acid; and at least about 620 ppm and less than about 1230 ppm of boric acid.

2. A fuel for a liquid feed fuel cell, the fuel comprising:
at least about 61% by weight formic acid;
a remaining weight substantially consisting of water;
less than about 25 ppm by weight methyl formate;
less than about 50 ppm by weight acetic acid; and
at least about 880 ppm and less than about 1760 ppm of $HBF_4$.

3. A method for preparing a formic acid fuel, the method comprising steps of:
cooling a commercial grade formic acid past the freezing point for formic acid;
separating contaminants from formic acid frozen by said step of cooling; and
liquefying the formic acid.

4. The method of claim 3, further comprising a preliminary step of distilling the commercial grade formic acid prior to said step of cooling.

5. The method of claim 3, further comprising repeating said steps of cooling, separating and liquefying to reduce levels of acetic acid and methyl formate.

6. A fuel for a liquid feed fuel cell, the fuel comprising:
at least about 61% by weight formic acid;
less than about 50 ppm acetic acid; and
at least about 620 ppm and less than about 1230 ppm boric acid.

7. A direct organic fuel cell comprising:
a fuel according to claim 6;
an anode;
a cathode;
an electrolyte between said anode and said cathode; an anode fuel supply to supply the fuel according to claim 6 to said anode, wherein cathode, and said electrolyte are operative to oxidize said organic fuel solution at said anode and reduce oxygen at said cathode, and said anode contains a catalyst comprised of palladium.

8. A fuel for a liquid feed fuel cell, the fuel comprising:
at least about 61% by weight formic acid;
less than about 50 ppm acetic acid; and
at least about 880 ppm $HBF_4$ and less than about 1760 ppm $HBF_4$.

* * * * *

UNITED STATES PATENT AND TRADEMARK OFFICE
CERTIFICATE OF CORRECTION

| | | |
|---|---|---|
| PATENT NO. | : 7,618,725 B2 | Page 1 of 1 |
| APPLICATION NO. | : 11/079893 | |
| DATED | : November 17, 2009 | |
| INVENTOR(S) | : Masel | |

It is certified that error appears in the above-identified patent and that said Letters Patent is hereby corrected as shown below:

On the Title Page:

(75) Inventors:

Please delete "Zakia Kahn" and replace with --Zakia Khan--.

[Declaration and Power of Attorney dated March 23, 2005]
[Assignment dated March 23, 2005]

Signed and Sealed this

Twenty-fifth Day of May, 2010

David J. Kappos
*Director of the United States Patent and Trademark Office*